(12) United States Patent
Sakaguchi

(10) Patent No.: US 11,285,556 B2
(45) Date of Patent: Mar. 29, 2022

(54) CORE MOVING DEVICE OF WIRE ELECTRIC DISCHARGE MACHINE

(71) Applicant: SODICK CO., LTD., Kanagawa (JP)

(72) Inventor: Masashi Sakaguchi, Kanagawa (JP)

(73) Assignee: Sodick Co., Ltd., Kanagawa (JP)

( * ) Notice: Subject to any disclaimer, the term of this patent is extended or adjusted under 35 U.S.C. 154(b) by 375 days.

(21) Appl. No.: 16/522,626

(22) Filed: Jul. 25, 2019

(65) Prior Publication Data

US 2020/0047271 A1  Feb. 13, 2020

(30) Foreign Application Priority Data

Aug. 7, 2018 (JP) .............................. JP2018-148293

(51) Int. Cl.
*B23H 11/00* (2006.01)
*B23H 7/08* (2006.01)
*B23H 7/02* (2006.01)

(52) U.S. Cl.
CPC .............. *B23H 11/00* (2013.01); *B23H 7/02* (2013.01); *B23H 7/08* (2013.01)

(58) Field of Classification Search
CPC .. B23H 7/02; B23H 7/08; B23H 11/00; B23B 51/0543; B23B 51/0453; B25H 1/0071
See application file for complete search history.

(56) References Cited

U.S. PATENT DOCUMENTS

| 3,926,316 | A | * | 12/1975 | Luttrell | ................... B66C 23/48 212/259 |
| 4,813,729 | A | * | 3/1989 | Speckhart | ............. H01F 7/0257 294/65.5 |
| 5,799,999 | A | * | 9/1998 | Schneider | ................. B25B 9/00 294/65.5 |
| 6,056,339 | A | * | 5/2000 | Berger | ...................... B25B 9/00 294/65.5 |
| 9,010,444 | B2 | * | 4/2015 | Quitberg | ................. E21B 23/00 166/381 |

FOREIGN PATENT DOCUMENTS

| JP | H0379227 | | 4/1991 |
| JP | 2002103144 | A * | 4/2002 |
| JP | 2016175149 | | 10/2016 |

OTHER PUBLICATIONS

Machine translation of Japan Patent No. 2002-103, 144, Sep. 2021. (Year: 2021).*

(Continued)

*Primary Examiner* — Geoffrey S Evans
(74) *Attorney, Agent, or Firm* — JCIPRNET

(57) ABSTRACT

A core moving device includes a core adsorption holding part which adsorbs a core cut out of a workpiece with a magnet and moves the core, in which the core adsorption holding part includes a rod member in which a distal end portion thereof is constituted of the magnet, a cylindrical member into which the rod member is inserted and which, on one hand, moves backward to expose a distal end surface of the rod member so that the core is adsorbed to the distal end surface of the rod member and, on the other hand, moves forward to protrude from the distal end surface of the rod member so that the core is removed from the distal end surface of the rod member, and a cylindrical member drive unit which at least moves the cylindrical member forward.

9 Claims, 11 Drawing Sheets

(56) References Cited

OTHER PUBLICATIONS

English translation of "Office Action of Japan Counterpart Application," dated Apr. 8, 2019, p. 1-p. 4.
"Office Action of India Counterpart Application", dated Mar. 22, 2021, p. 1-p. 5.
"Office Action of China Counterpart Application", dated Aug. 6, 2020, with English translation thereof, p. 1-p. 14.

\* cited by examiner

CORE MOVING DEVICE OF WIRE ELECTRIC DISCHARGE MACHINE

CROSS-REFERENCE TO RELATED APPLICATION

This application claims the priority benefit of Japan application serial no. 2018-148293, filed on Aug. 7, 2018. The entirety of the above-mentioned patent application is hereby incorporated by reference herein and made a part of this specification.

BACKGROUND

Technical Field

The disclosure relates to a core moving device of a wire electric discharge machine including a core adsorption holding part which adsorbs a core cut out of a workpiece using wire electric discharge machining with a magnetic force of a magnet and configured to move the core by moving the core adsorption holding part relative to the workpiece.

Description of Related Art

A core moving device of a wire electric discharge machine is described, for example, in the core extraction device of the electric discharge machine of Patent Document 1. The core extraction device of Patent Document 1 includes an arm that rotates in a horizontal direction and moves up and down in a vertical direction. A magnet for adsorbing the core is attached to a distal end of the arm. The core adsorbed by a magnetic force of the magnet is removed from the magnet against the magnetic force when a protrusion of the distal end of the arm protrudes toward the core.

Patent Document 1 still has room for improvement. The protrusion pushes one point on a surface of the core facing the magnet. In the core pushed by the protrusion, there are cases in which only a portion close to the protrusion is separated from the magnet and a portion far from the protrusion is not separated from the magnet.

RELATED ART LITERATURE

Patent Documents

Patent Document 1: Japanese Laid-open No. H03-079227

SUMMARY

A core moving device (2) of a wire electric discharge machine (1) of an embodiment of the disclosure includes a core adsorption holding part (20) which adsorbs a core (WP1) cut out of a workpiece (WP) with a magnetic force of a magnet (21) and moves relative to the workpiece, in which the core adsorption holding part includes a rod member (22) in which at least a distal end portion thereof is constituted of the magnet, a cylindrical member (23) into which the rod member is inserted and which, on one hand, moves backward relative to the rod member to a base end portion side of the rod member to expose a distal end surface (22a) of the rod member so that the core is adsorbed to the distal end surface of the rod member by the magnet and, on the other hand, moves forward relative to the rod member to the distal end portion side of the rod member to protrude beyond the distal end surface of the rod member so that the core having been adsorbed to the distal end surface of the rod member by the magnet is pushed out against the magnetic force and removed, and a cylindrical member drive unit (25) which moves the cylindrical member forward relative to the rod member to at least the distal end portion side of the rod member.

DESCRIPTION OF THE EMBODIMENTS

Figure 1:
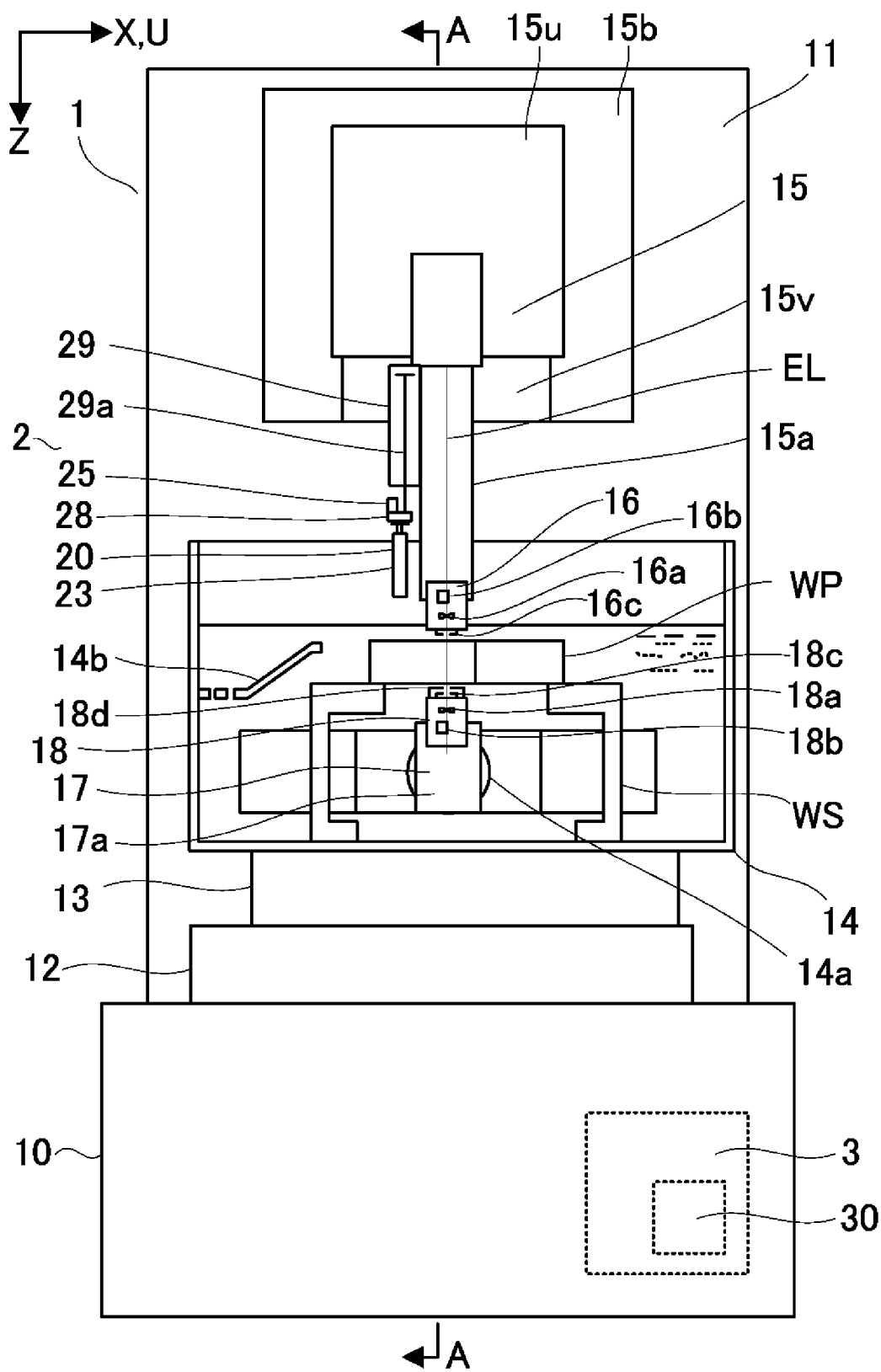
FIG. 1 is a front cross-sectional view schematically illustrating a wire electric discharge machine including a core moving device according to an embodiment of the disclosure.

One or some exemplary embodiments of the disclosure provide a core moving device of a wire electric discharge machine capable of reliably removing a core adsorbed to a magnet from the magnet at a predetermined timing. Also, one or some exemplary embodiments of the disclosure provide a core moving device of a wire electric discharge machine which can move the core reliably. Also, one or some exemplary embodiments of the disclosure provide a core moving device of a wire electric discharge machine which is small-sized and is simple in configuration. Additional objects and advantages of the disclosure will be set forth in the description that follows.

A core moving device (2) of a wire electric discharge machine (1) of an embodiment of the disclosure includes a core adsorption holding part (20) which adsorbs a core (WP1) cut out of a workpiece (WP) with a magnetic force of a magnet (21) and moves relative to the workpiece, in which the core adsorption holding part includes a rod member (22) in which at least a distal end portion thereof is constituted of the magnet, a cylindrical member (23) into which the rod member is inserted and which, on one hand, moves backward relative to the rod member to a base end portion side of the rod member to expose a distal end surface (22a) of the rod member so that the core is adsorbed to the distal end surface of the rod member by the magnet and, on the other hand, moves forward relative to the rod member to the distal end portion side of the rod member to protrude beyond the distal end surface of the rod member so that the core having been adsorbed to the distal end surface of the rod member by the magnet is pushed out against the magnetic force and removed, and a cylindrical member drive unit (25) which moves the cylindrical member forward relative to the rod member to at least the distal end portion side of the rod member.

The core moving device of a wire electric discharge machine according to one or some exemplary embodiments of the disclosure can reliably remove the core adsorbed to the magnet from the magnet at a predetermined timing. Also, the core moving device of a wire electric discharge machine of one or some exemplary embodiments of the disclosure can move the core reliably. Also, the core moving device of a wire electric discharge machine of one or some exemplary embodiments of the disclosure can realize a small-sized device with a simple configuration.

Figure 2:
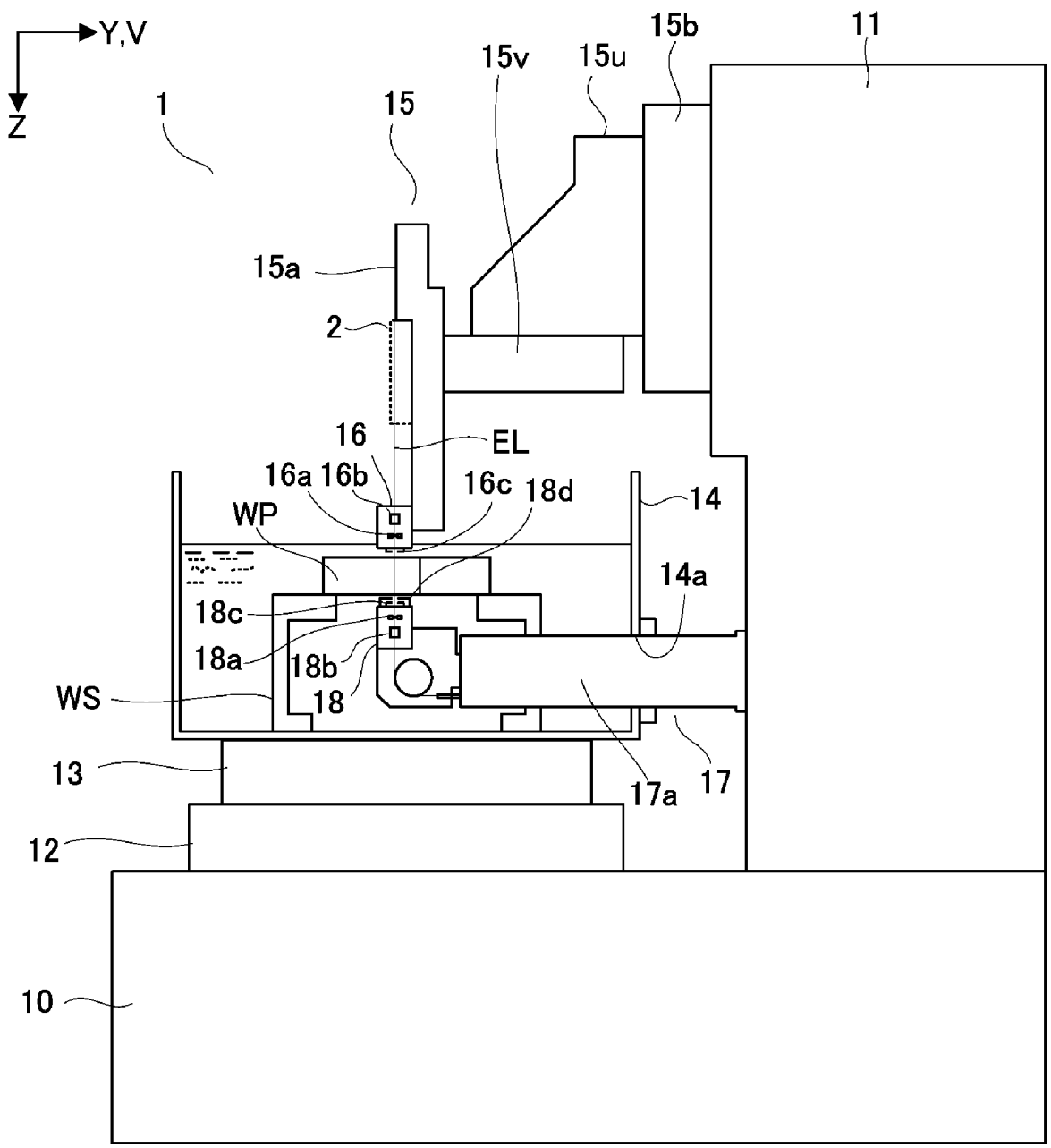
FIG. 2 is a side cross-sectional view taken along line A-A of FIG. 1.
Figure 3:
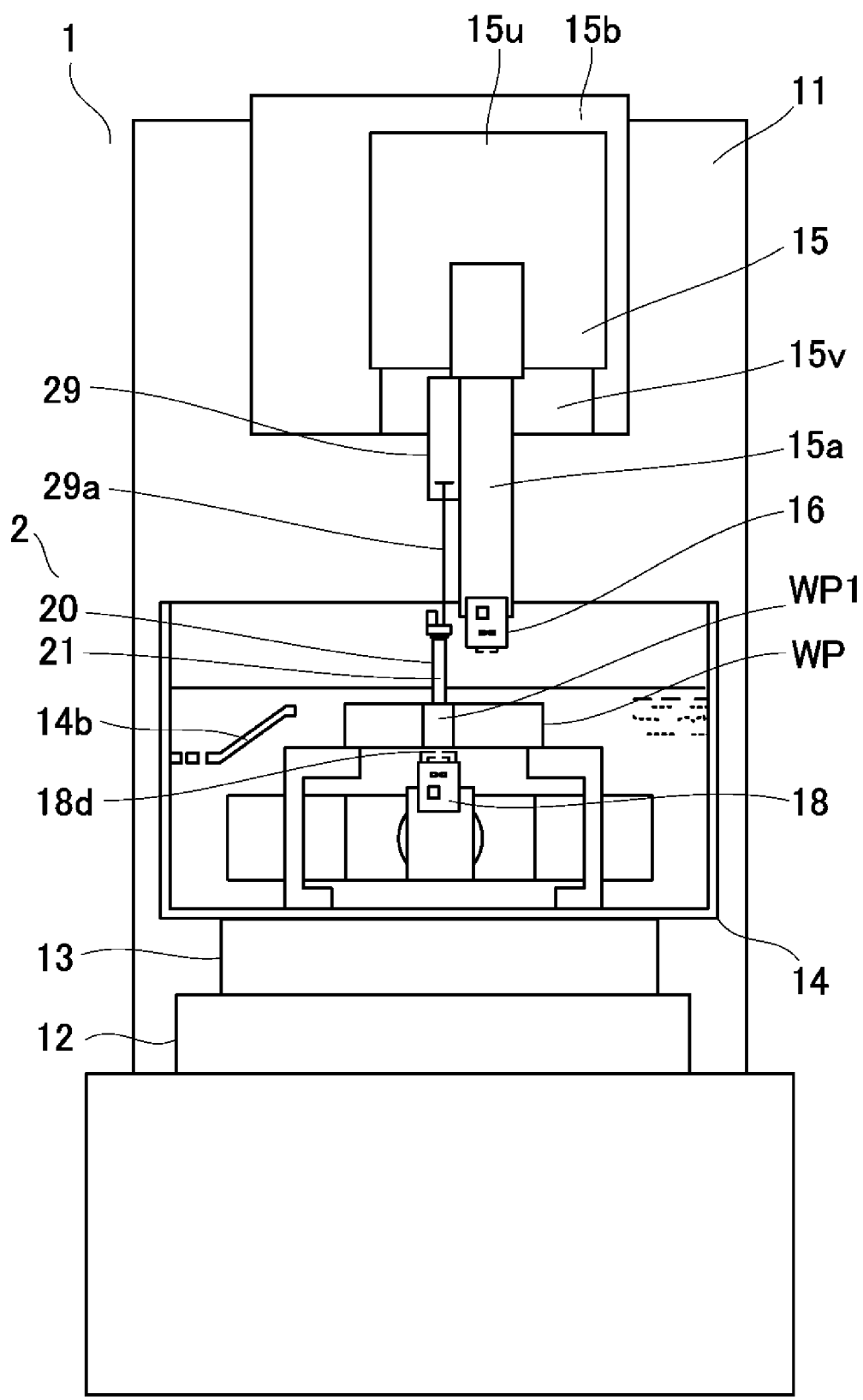
FIG. 3 is a schematic view illustrating a state of a core adsorption holding part to which a core is adsorbed.
Figure 4:
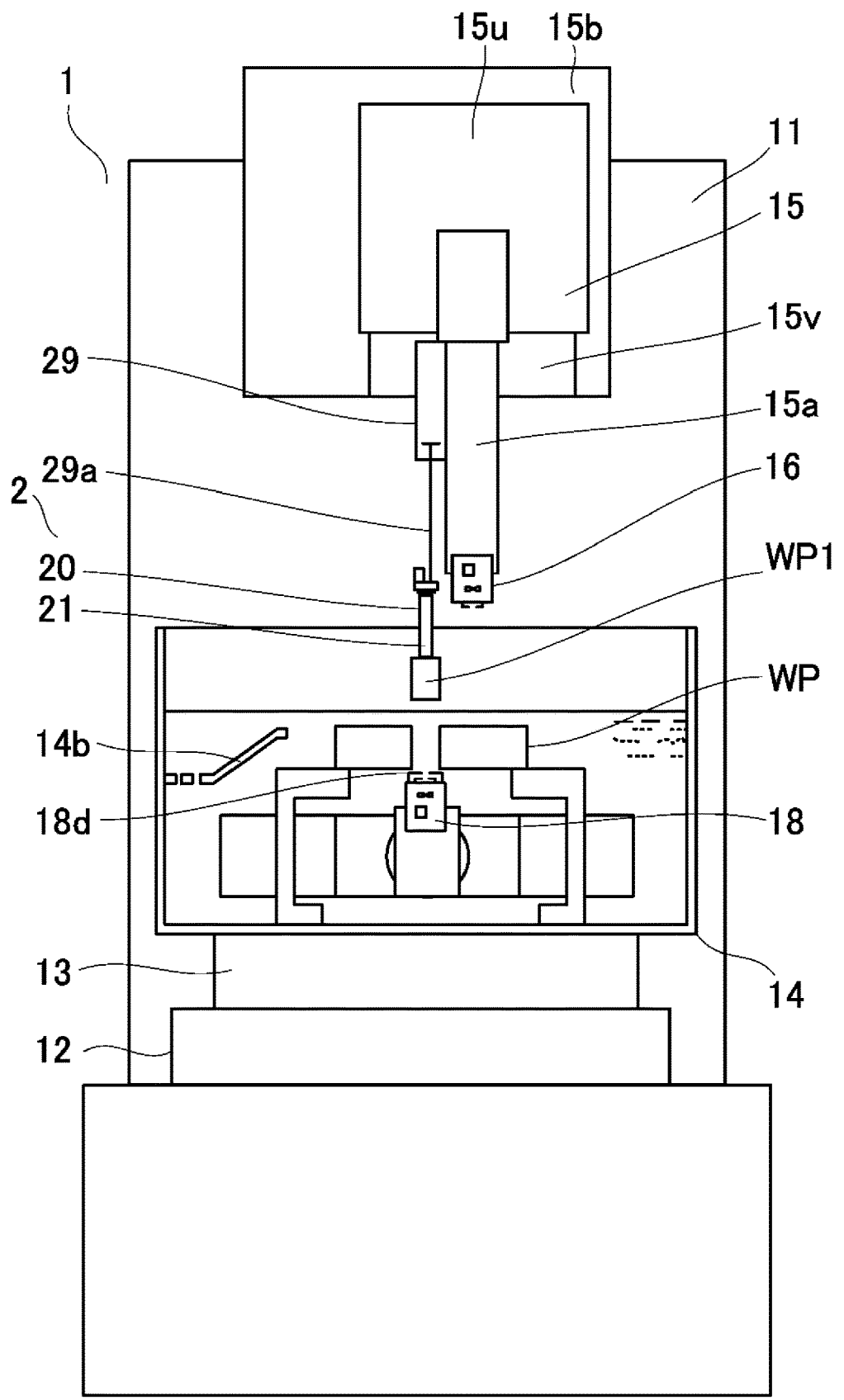
FIG. 4 is a schematic view illustrating a state in which the core adsorption holding part to which the core is adsorbed is raised and the core is extracted out of a workpiece.
Figure 5:
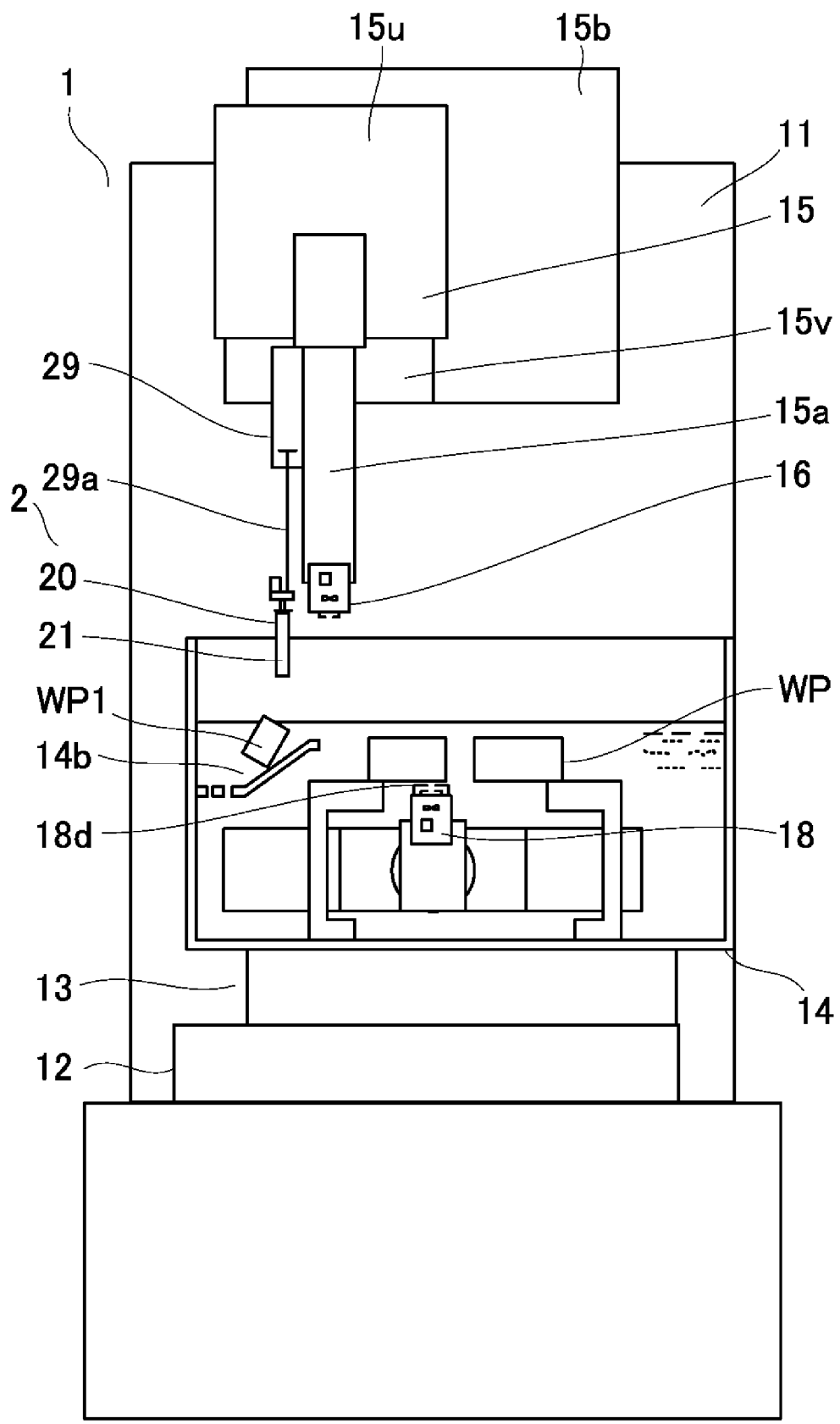
FIG. 5 is a schematic view illustrating a state in which the core adsorption holding part to which the core is adsorbed is moved above a core recovery bucket and the core is removed from the core adsorption holding part.
Figure 6:
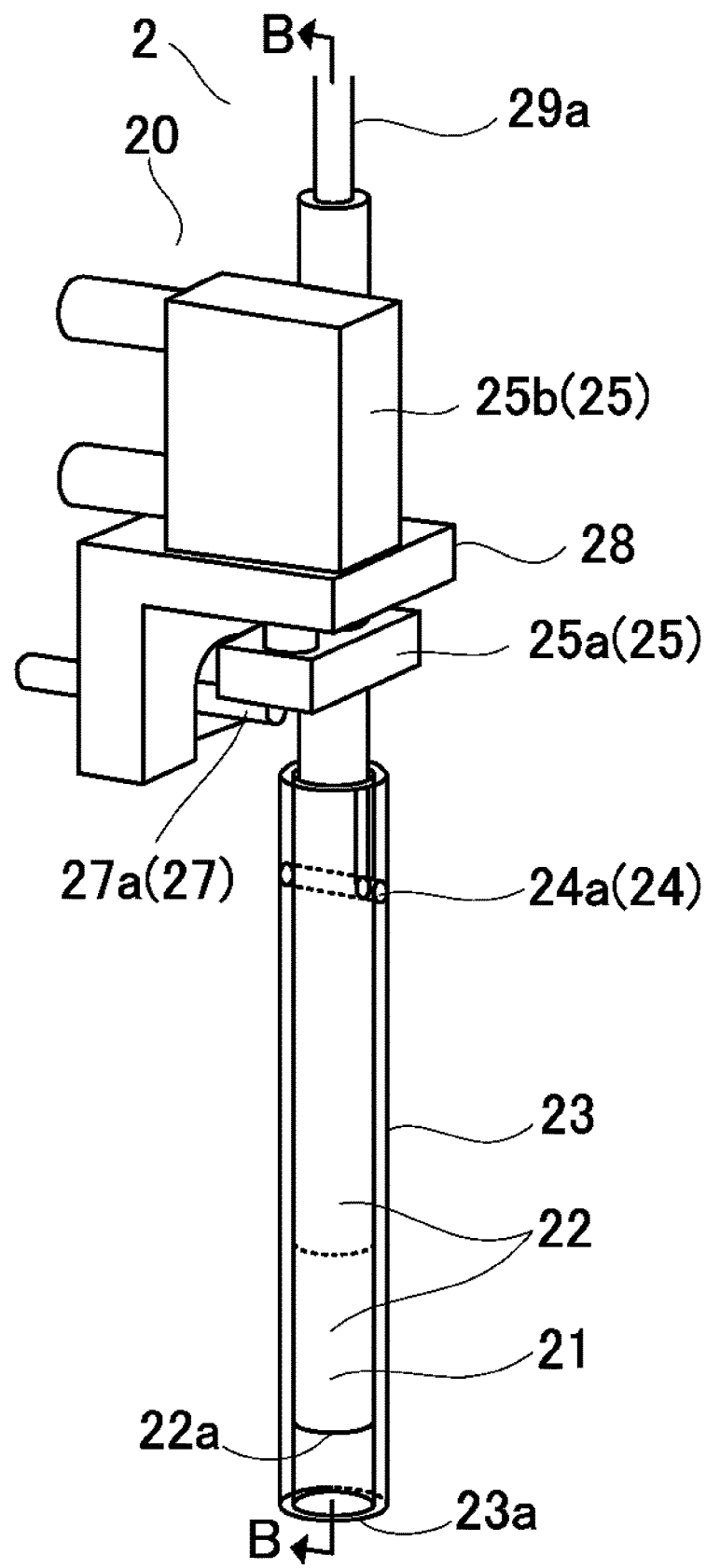
FIG. 6 is a perspective view schematically illustrating the core adsorption holding part of the core moving device of the embodiment of the disclosure.
Figure 7:
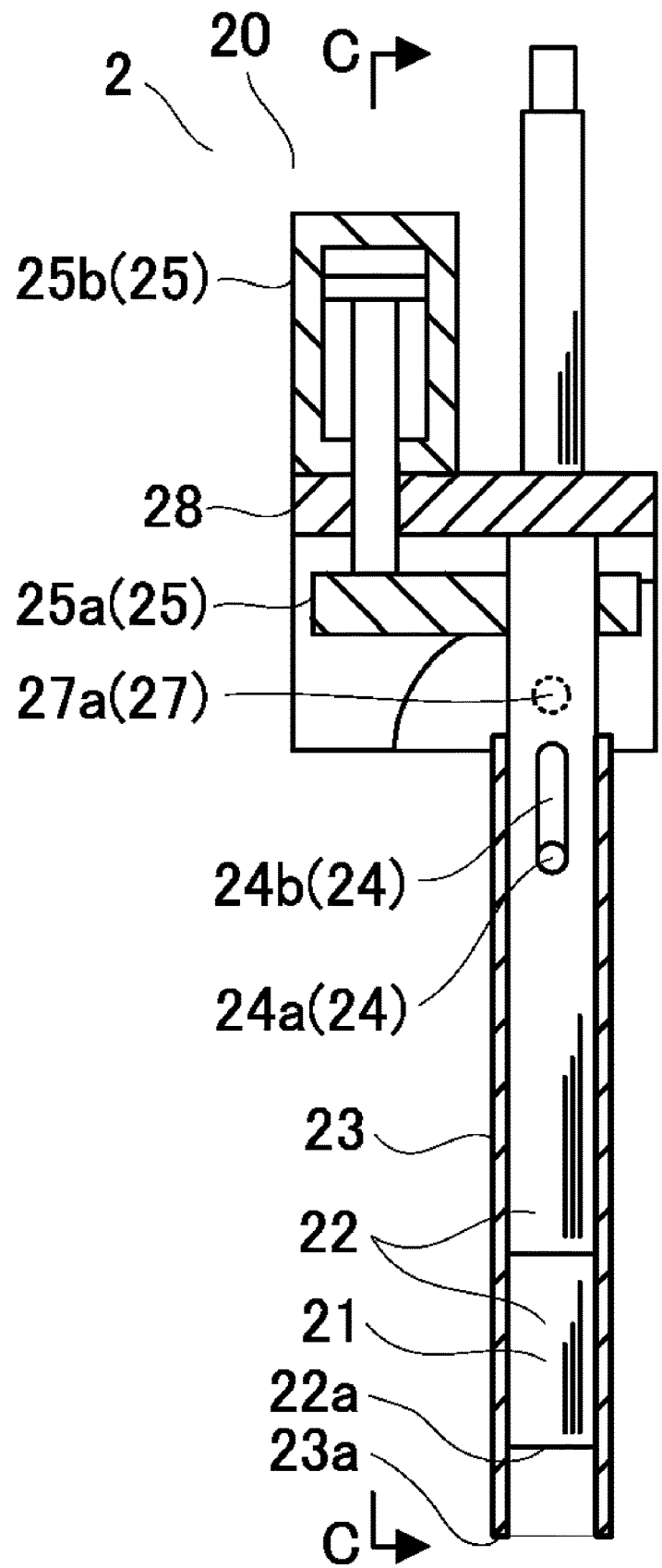
FIG. 7 is a front cross-sectional view taken along line B-B of FIG. 6.
Figure 8:
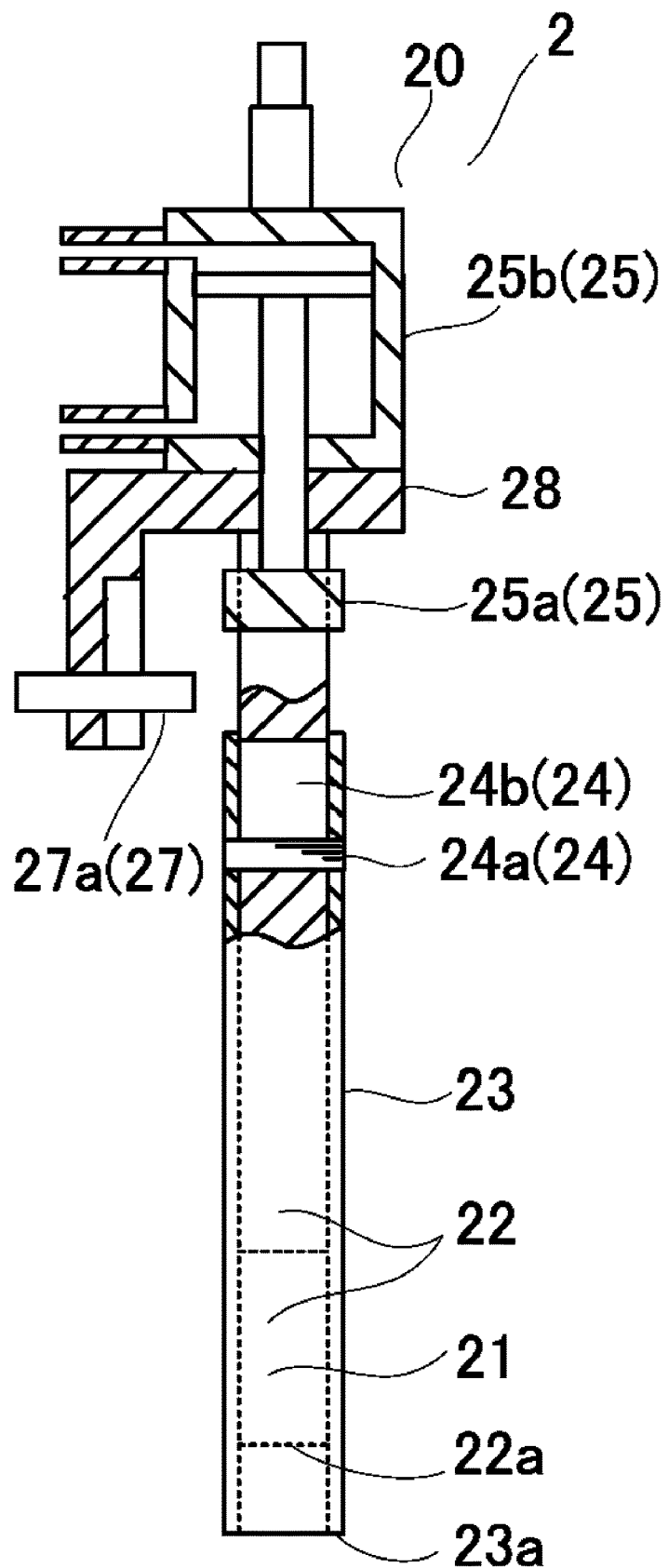
FIG. 8 is a cross-sectional view taken along line C-C of FIG. 7 and is a side cross-sectional view schematically illustrating the core adsorption holding part before the core is adsorbed thereto.
Figure 9:
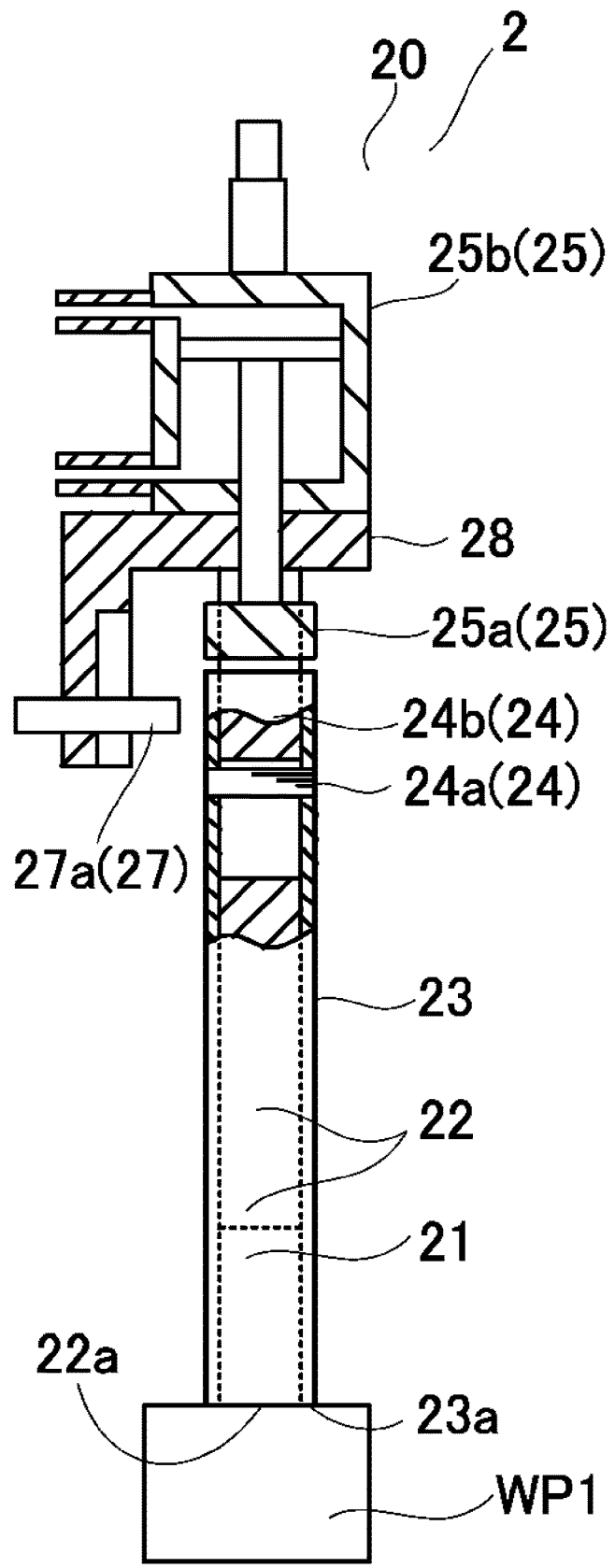
FIG. 9 is a side cross-sectional view schematically illustrating the core adsorption holding part when the core is adsorbed thereto.
Figure 10:
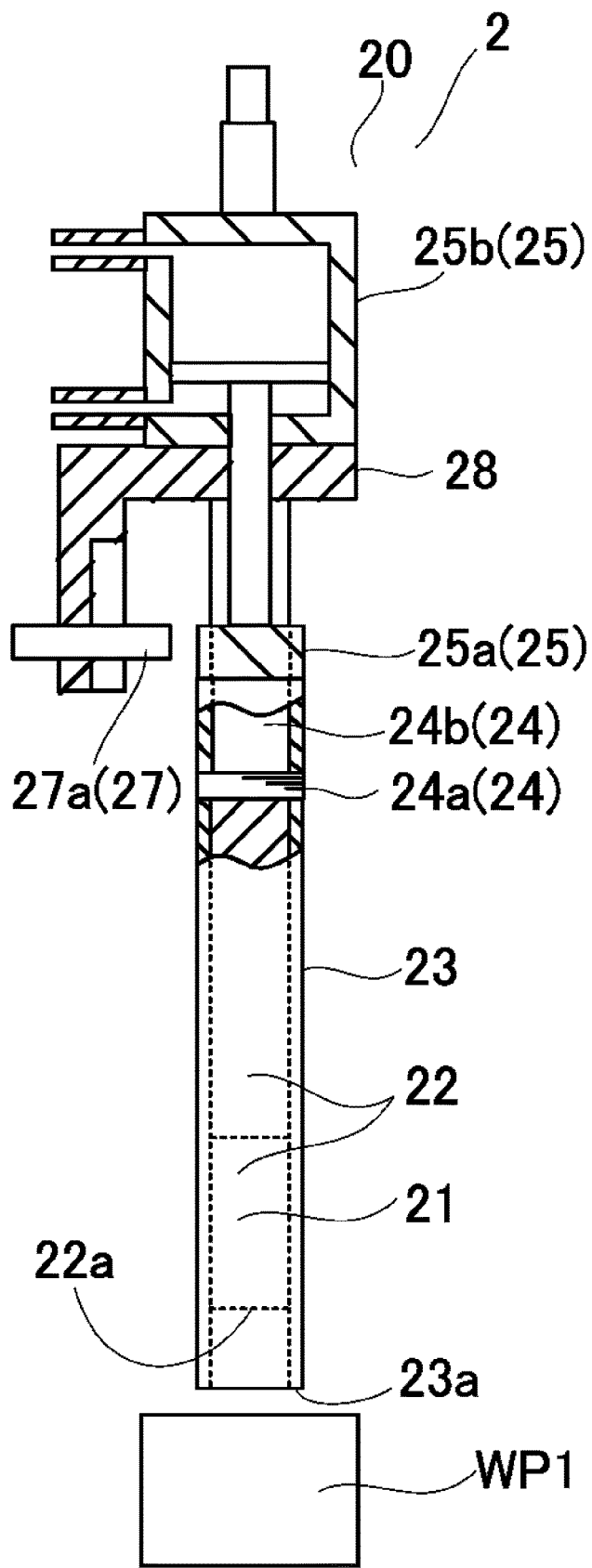
FIG. 10 is a side cross-sectional view schematically illustrating the core adsorption holding part when the core is removed therefrom.
Figure 11:
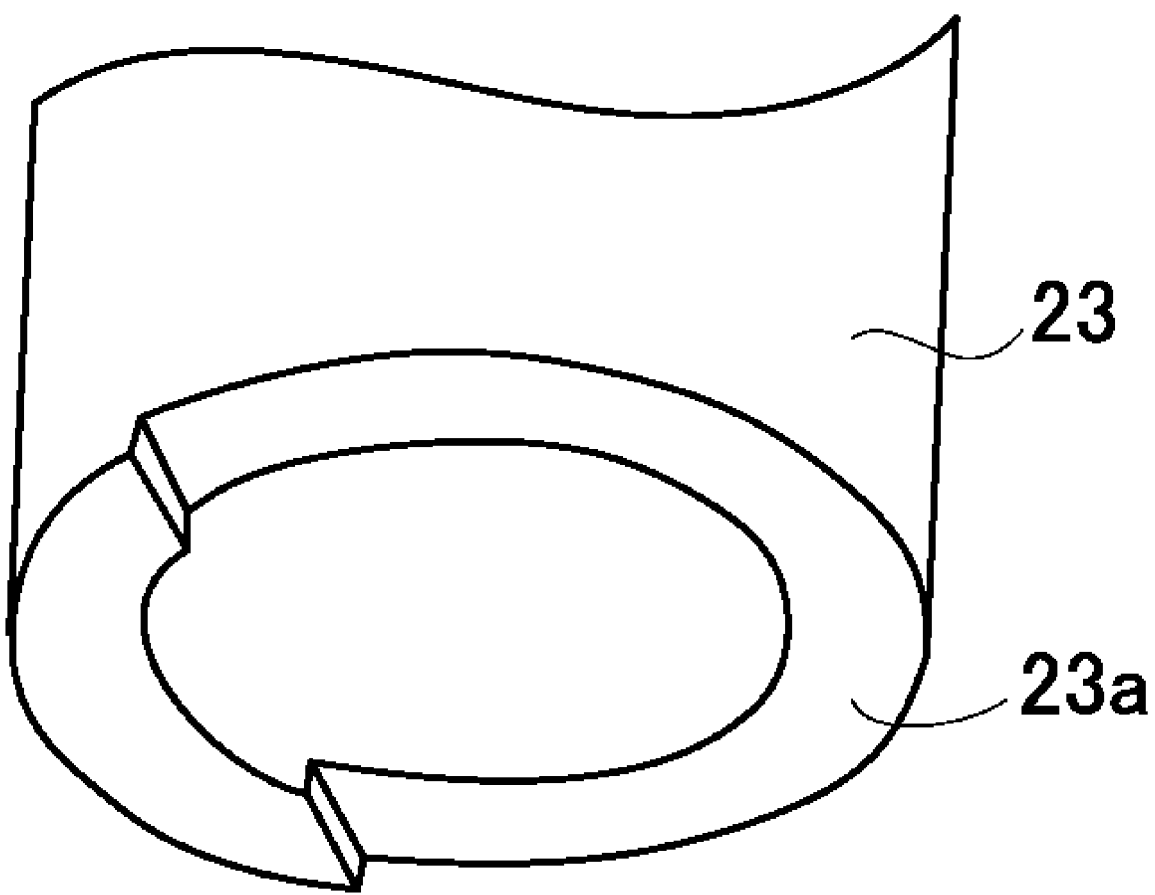
FIG. 11 is a schematic view illustrating a step on a distal end surface of a cylindrical member according to another embodiment.

Hereinafter, a core moving device of a wire electric discharge machine according to an embodiment of the disclosure will be described in detail with reference to the drawings. FIG. 1 is a front cross-sectional view schematically illustrating the wire electric discharge machine including the core moving device according to the embodiment of the disclosure. FIG. 2 is a side cross-sectional view taken along line A-A of FIG. 1. FIG. 3 is a schematic view illustrating a state of a core adsorption holding part to which a core is adsorbed. FIG. 4 is a schematic view illustrating a state in which the core adsorption holding part to which the core is adsorbed is raised and the core is extracted out of a workpiece. FIG. 5 is a schematic view illustrating a state in which the core adsorption holding part to which the core is adsorbed is moved above a core recovery bucket and the core is removed from the core adsorption holding part. FIG. 6 is a perspective view schematically illustrating the core adsorption holding part of the core moving device of the embodiment of the disclosure. FIG. 7 is a front cross-sectional view taken along line B-B of FIG. 6. FIG. 8 is a cross-sectional view taken along line C-C of FIG. 7 and is a front cross-sectional view schematically illustrating the core adsorption holding part before the core is adsorbed thereto. FIG. 9 is a side cross-sectional view schematically illustrating the core adsorption holding part when the core is adsorbed thereto. FIG. 10 is a side cross-sectional view schematically illustrating the core adsorption holding part when the core is removed therefrom. FIG. 11 is a schematic view illustrating a step on a distal end surface of a cylindrical member according to another embodiment.

A wire electric discharge machine 1 illustrated in FIGS. 1 to 5 supplies a machining voltage between a workpiece WP and a wire electrode EL from a power supply device (not illustrated) for electric discharge machining, moves the wire electrode EL traveling while guided by a pair of upper and lower guides relative to the workpiece WP disposed between the pair of upper and lower guides along a desired path, and cuts out a core WP1 of a desired shape from the workpiece WP.

The wire electrode EL is supplied, for example, from a reel (not illustrated) to an upper guide 16a as a fresh wire electrode, travels vertically downward from the upper guide 16a toward a lower guide 18a, and then is recovered by a wire electrode recovery bucket (not illustrated) from the lower guide 18a as a used wire electrode.

The wire electric discharge machine 1 includes a bed 10, a column 11, a saddle 12, a table 13, a machining tank 14, a work stand WS, an upper support part 15, a lower support part 17, and a control device 3, and a power supply device (not illustrated) for electric discharge machining. The bed 10 is placed on an installation surface. The column 11 is provided vertically to stand upright at a rear portion of the bed 10. The upper support part 15 and the lower support part 17 are attached to the column 11.

The saddle 12 is provided on the bed 10 and moves on the bed 10 in a Y-axis direction. The table 13 is provided on the saddle 12 and moves on the saddle 12 in an X-axis direction. The control device 3 controls movement of the saddle 12 and the table 13. The X-axis direction is a front-rear direction of the bed 10. The Y-axis direction is a lateral direction of the bed 10. A plane formed by the X-axis and the Y-axis is horizontal.

The machining tank 14 is fixed on the table 13 and moves together with the table 13. The machining tank 14 is filled with a machining fluid. Contaminated machining fluid discharged from the machining tank is temporarily stored in a sub tank (not illustrated). The machining fluid in the sub tank is cleaned of contamination, its temperature is controlled such that it becomes a predetermined temperature, and it is returned to the machining tank 14 at a necessary timing.

The work stand WS is provided in the machining tank 14 and moves together with the machining tank 14. The workpiece WP is fixed to the work stand WS and moves together with the machining tank 14. The workpiece WP moves in the X-axis direction and the Y-axis direction.

The upper support part 15 supports the upper guide part 16. The upper guide part 16 includes the upper guide 16a, an upper conductive body 16b, and an upper machining fluid jet nozzle 16c. The upper guide 16a guides the wire electrode EL above the workpiece WP. The upper conductive body 16b is in contact with the wire electrode EL above the upper guide 16a and connects the wire electrode EL to the power supply device for electric discharge machining. The upper machining fluid jet nozzle 16c is provided at a lower end of the upper guide part 16 and jets the machining fluid supplied from the sub tank onto an upper surface of the workpiece WP. The wire electrode EL may pass through an opening of the upper machining fluid jet nozzle 16c which jets the machining fluid.

The upper support part 15 includes a head 15b, a U-axis moving unit 15u, a V-axis moving unit 15v, and an upper arm 15a in this order from the column 11 side. The head 15b is provided on the column 11 and moves the U-axis moving unit 15u in a Z-axis direction with respect to the column 11. The U-axis moving unit 15u is provided on the head 15b and moves the V-axis moving unit 15v in the U-axis direction with respect to the head 15b. The V-axis moving unit 15v is provided on the U-axis moving unit 15u and moves the upper arm 15a in the V-axis direction.

The upper arm 15a extends in the Z-axis direction from the V-axis moving unit 15v, and an upper guide part 16 is provided at a lower end thereof. The upper guide part 16 moves in the U-axis direction, the V-axis direction, and the Z-axis direction. The U-axis is parallel to the X-axis. The V-axis is parallel to the Y-axis. A plane formed by the U-axis and the V-axis is parallel to a plane formed by the X-axis and the Y-axis and is horizontal. The Z-axis is perpendicular to the X-axis and the Y-axis and is vertical. The Z-axis direction is a vertical direction of the bed 10.

The wire electrode EL supported obliquely due to horizontal movement of the upper guide 16a relative to the lower guide 18a enables taper-shaped wire electric discharge machining.

The lower support part 17 is disposed below the upper support part 15. The lower support part 17 supports a lower guide part 18. The lower guide part 18 includes the lower guide 18a, a lower conductive body 18b, and a lower machining fluid jet nozzle 18c. The lower guide 18a guides the wire electrode EL below the workpiece WP. The lower conductive body 18b is in contact with the wire electrode EL below the lower guide 18a and connects the wire electrode EL to the power supply device for electric discharge machining. The lower machining fluid jet nozzle 18c is provided at an upper end of the lower guide part 18 and jets the machining fluid supplied from the sub tank onto a lower surface of the workpiece WP. The wire electrode EL may pass through an opening of the lower machining fluid jet nozzle 18c which jets the machining fluid.

The lower support part 17 includes a lower arm 17a. A body portion of the lower arm 17a passes through a through hole 14a which penetrates a tank wall of the machining tank 14 in the Y-axis direction. The through hole 14a slides relative to the machining tank 14 in the X-axis direction. A space between the through hole 14a and the lower arm 17a is sealed such that the lower arm 17a is slidable in the through hole 14a.

The lower arm 17a extends from the column 11 in the Y-axis direction, and the lower guide part 18 is provided at a distal end thereof. The lower guide part 18 is disposed on a lower side of the workpiece WP in the machining tank 14. The lower guide part 18 moves relative to the workpiece WP in the X-axis direction and the Y-axis direction.

The wire electric discharge machine 1 can adjust a distance between the upper guide part 16 and the lower guide part 18 by moving the upper guide part 16 in the vertical direction. The wire electric discharge machine 1 can adjust an inclination of the wire electrode EL between the upper guide part 16 and the lower guide part 18 by moving the upper guide part 16 in the horizontal direction. The wire electric discharge machine 1 disposes the workpiece WP between the upper guide part 16 and the lower guide part 18, moves the workpiece WP relative to the wire electrode EL along a desired path in the machining fluid of the machining tank 14, and cuts out the core WP1 of a desired shape from the workpiece WP.

The upper machining fluid jet nozzle 16c may jet the machining fluid at a predetermined pressure onto the upper surface of the workpiece WP. The lower machining fluid jet nozzle 18c may jet the machining fluid at a predetermined pressure onto the lower surface of the workpiece WP. The upper machining fluid jet nozzle 16c and the lower machining fluid jet nozzle 18c may simultaneously jet the machining fluid.

A clean machining fluid jetted from at least one of the upper machining fluid jet nozzle 16c and the lower machining fluid jet nozzle 18c pushes out and replaces the machining fluid containing machined debris from a machining gap between the wire electrode EL and the workpiece WP. The machining fluid jetted from both the upper machining fluid jet nozzle 16c and the lower machining fluid jet nozzle 18c can prevent an inclination of the core WP1 in the process of being cut out of the workpiece WP and an inclination of the core WP1 immediately after being cut out of the workpiece WP.

The machining fluid jetted from the lower machining fluid jet nozzle 18c can prevent an inclination of the core WP1 in the process of being cut out of the workpiece WP and an inclination of the core WP1 immediately after being cut out of the workpiece WP. The machining fluid jetted from the lower machining fluid jet nozzle 18c can lift the core WP1 cut out of the workpiece WP.

The lower guide part 18 may include a core holding pad 18d between the lower machining fluid jet nozzle 18c and the workpiece WP. A material of the core holding pad 18d may be, for example, a resin material. The core holding pad 18d is provided at the upper end of the lower guide part 18 and has an opening through which the machining fluid jetted from the wire electrode EL and the lower machining fluid jet nozzle 18c passes. A surface on the workpiece WP side of the core holding pad 18d is as close as possible to the lower surface of the workpiece WP. A plurality of protrusions may be formed on the surface of the workpiece WP side of the core holding pad 18d.

The lower guide part 18 moves relative to the core WP1 and moves under the core WP1 cut out of the workpiece WP. The lower machining fluid jet nozzle 18c stops jetting of the machining fluid. The cut-out core WP1 is placed on the core holding pad 18d. When the core WP1 is pulled up out of the workpiece WP, the core WP1 can be simply taken out without being caught.

The control device 3 controls various drive mechanisms or the like of the wire electric discharge machine 1 to cause the wire electric discharge machine 1 to perform various operations.

Hereinafter, a specific configuration of an embodiment of the disclosure will be described. A core moving device 2 of the wire electric discharge machine 1 of an embodiment of the disclosure, for example, takes out the core WP1 which has been cut out of the workpiece WP from the inside of the workpiece WP and then recovers the core WP1 in a core recovery bucket 14b provided in the machining tank 14 of the wire electric discharge machine 1. Hereinafter, the core moving device 2 of the embodiment of the disclosure will be described by taking a device of recovering the core WP1 as an example.

The core moving device 2 of the wire electric discharge machine 1 of the embodiment of the disclosure illustrated in FIGS. 6 to 10 includes a core adsorption holding part 20. The core adsorption holding part 20 includes a magnet 21, a rod member 22, a cylindrical member 23, and a cylindrical member drive unit 25. The magnet 21 is a permanent magnet or an electromagnet.

At least a distal end portion of the rod member 22 is constituted of the magnet 21. The core WP1 is adsorbed to the magnet 21 and held by a distal end surface 22a of the rod member 22.

The rod member 22 is inserted into the cylindrical member 23. The cylindrical member 23 moves forward and backward in the axial direction of the rod member 22 relative to the rod member 22. A forward direction is a direction in which the cylindrical member 23 moves toward the distal end portion of the rod member 22. A backward direction is a direction in which the cylindrical member 23 moves toward a base end portion of the rod member 22. A material of the cylindrical member 23 may be a nonmagnetic material not sticking to a magnet, such as, for example, a plastic, a nonmagnetic metal, or a nonmagnetic ceramic.

The cylindrical member 23 moves forward until a front portion of the cylindrical member 23 protrudes beyond a distal end surface 22a of the rod member 22. The cylindrical member 23 moves backward until the distal end surface 22a of the rod member 22 is exposed. The cylindrical member 23 may only be moved backward until at least the distal end surface 22a of the rod member 22 and a distal end surface 23a of the cylindrical member 23 coincide with each other.

The cylindrical member 23 may include a movement restricting member 24. The movement restricting member 24 restricts protrusion of the distal end surface 23a of the cylindrical member 23 beyond a predetermined distance from the distal end surface 22a of the rod member 22. The predetermined distance between the distal end surface 23a of the cylindrical member 23 and the distal end surface 22a of the rod member 22 when the cylindrical member 23 protrudes until being restricted by the movement restricting member 24 may be set to a distance at which the core WP1 is not attracted to the distal end surface 22a of the separated rod member 22 by a magnetic force. The movement restricting member 24 may be constituted by, for example, a key member 24a penetrating the rod member 22 and the cylindrical member 23 perpendicularly to the axis of the rod member 22, and an elongated hole 24b which is formed in the rod member 22, through which the key member 24a is inserted, and which allows the key member 24a to move parallel to the axial direction of the rod member 22 by only a predetermined distance. The movement restricting member 24 is not limited only to the embodiment, and various configurations can be applied as long as the movement restricting member 24 can perform a function of restricting the movement.

The cylindrical member drive unit 25 moves the cylindrical member 23 at least forward. The cylindrical member drive unit 25 may include, for example, a push member 25a and a push member drive source 25b. The push member 25a is connected to a drive shaft of the cylindrical member drive unit 25. The push member 25a is moved forward from a retreat position by the push member drive source 25b to move the cylindrical member 23 forward and is moved backward to return to the retreat position by the push member drive source 25b leaving the cylindrical member 23. The cylindrical member drive unit 25 is not limited to the embodiment and may move the cylindrical member 23 forward and backward. Drive sources of various types such as a pneumatic actuator, a hydraulic actuator, or an electric motor may be employed as appropriate for a drive source of the cylindrical member drive unit 25.

The core adsorption holding part 20 moves the cylindrical member 23 backward relative to the rod member 22 to expose the distal end surface 22a of the rod member 22. The exposed distal end surface 22a of the rod member 22 adsorbs the core WP1 with the magnetic force of the magnet 21. The core adsorption holding part 20 moves the cylindrical member 23 forward relative to the rod member 22 and pushes out the core WP1 against the magnetic force by the cylindrical member 23 which protrudes by a predetermined distance from the distal end surface 22a of the rod member 22 until it is restricted by the movement restricting member 24. When the core WP1 is separated from the distal end surface 22a of the rod member 22 by a predetermined distance, the core WP1 cannot be adsorbed by the magnetic force of the magnet 21 and is removed from the rod member 22.

Further, the core adsorption holding part 20 may include a core adsorption detector 27. The core adsorption detector 27 detects whether or not the core WP1 is adsorbed to the distal end surface 22a of the rod member 22. The core adsorption detector 27 may output a signal indicating, for example, that the cylindrical member 23 has moved backward relative to the rod member 22 until the distal end surface 22a of the rod member 22 is exposed.

The core adsorption detector 27 may include, for example, a proximity sensor 27a or a contact sensor (not illustrated). The proximity sensor or the contact sensor may be attached to a position facing a base end portion of the cylindrical member 23 when the distal end surface 22a of the rod member 22 is exposed and the core WP1 is adsorbed to the distal end surface 22a of the rod member 22. The proximity sensor 27a detects proximity of the base end portion of the cylindrical member 23 in a non-contact manner. The contact sensor detects proximity of the base end portion of the cylindrical member 23 by contact.

The core adsorption holding part 20 may include a support member 28. The base end portion of the rod member 22 and the push member drive source 25b are attached to the support member 28. The proximity sensor 27a or the contact sensor of the core adsorption detector 27 is attached to the support member 28. The push member 25a may have a hole through which the rod member 22 slides formed therein and may be moved forward and backward between the support member 28 and a base end surface of the cylindrical member 23.

The core moving device 2 includes a core adsorption holding part drive means for moving the core adsorption holding part 20 relative to the workpiece WP in the X-axis direction, the Y-axis direction, and the Z-axis direction. The core moving device 2 may have the core adsorption holding part 20 attached to the upper arm 15a and move the core adsorption holding part 20 relative to the workpiece WP using various drive units of the wire electric discharge machine 1 for moving the wire electrode EL relative to the workpiece WP and various drive units of the wire electric discharge machine 1 for moving the upper guide part 16 relative to the lower guide part 18 as the core adsorption holding part drive means. The core moving device 2 may use both the various driving units provided in the wire electric discharge machine 1 and dedicated driving units for the core adsorption holding part as the core adsorption holding part drive means.

The core moving device 2 of the embodiment of the disclosure may be configured, for example, as illustrated in FIGS. 1 to 5. The rod member 22 is disposed vertically, that is, in the Z-axis direction, with the base end portion up and the distal end portion down. The cylindrical member 23 moves relative to the rod member 22, and can be lowered by its own weight until it is restricted by the movement restricting member 24 and can be raised by an external force against its own weight.

In the core adsorption holding part 20, a vertical drive shaft 29a of a vertical drive unit 29, which is one of the core adsorption holding part drive means, is connected to the support member 28. The vertical drive unit 29 is attached to the upper arm 15a of the wire electric discharge machine 1. The core adsorption holding part 20 moves vertically in the Z-axis direction by the vertical drive unit 29. In further addition, the core adsorption holding part 20 can also move vertically in the Z-axis direction by a drive unit for moving the upper arm 15a vertically, which is one of the core adsorption holding part drive means. The core adsorption holding part 20 moves back and forth and left and right in the X-axis direction and the Y-axis direction by a drive unit that moves the upper arm 15a back and forth and left and right, which is one of the core adsorption holding part drive means. In further addition, the core adsorption holding part 20 can also move back and forth and left and right relative to the workpiece WP in the X-axis direction and the Y-axis direction by a drive unit of the table 13 moving left and right relative to the upper arm 15a and a drive unit of the saddle 12 moving back and forth relative to the upper arm 15a.

The core moving device 2 of the embodiment of the disclosure includes a core movement controller 30. The core movement controller 30 controls various drive mechanisms of the core moving device 2 to cause the core moving device 2 to perform various operations. The control device 3 of the wire electric discharge machine 1 may include the core movement controller 30.

The core moving device 2 of the wire electric discharge machine 1 of the embodiment of the disclosure operates, for example, as follows. First, as illustrated in FIG. 1, the wire electric discharge machine 1 cuts out the core WP1 from the workpiece WP using wire electric discharge machining. Next, as illustrated in FIG. 2, the wire electric discharge machine 1 cuts the wire electrode EL above the upper guide 16a with a wire cutter (not illustrated). The wire electrode EL on the lower guide part 18 side is recovered to a wire electrode recovery box (not illustrated) after being cut. The lower guide part 18 moves relative to the workpiece WP and moves the core holding pad 18d provided on the lower guide part 18 under the core WP1. The core WP1 is held on the core holding pad 18d. The upper arm 15a is raised to move the upper guide part 16 to a predetermined position.

As illustrated in FIG. 2, the core moving device 2 moves the upper arm 15a in the horizontal direction to move the core adsorption holding part 20 above the core WP1. The core moving device 2 lowers the core adsorption holding part 20 using the vertical drive unit 29. As illustrated in FIGS. 7 and 8, the cylindrical member 23 protrudes from the distal end surface 22a of the rod member 22 by its own weight until it is restricted by the movement restricting member 24.

In the core adsorption holding part 20 being lowered, the distal end surface 23a of the cylindrical member 23 first comes into contact with an upper surface of the core WP1. In the core adsorption holding part 20 being further lowered, the cylindrical member 23 is relatively raised with respect to the rod member 22 being lowered. As illustrated in FIG. 9, in the core adsorption holding part 20 being further lowered, the lowering is stopped at a position at which the distal end surface 22a of the exposed rod member 22 comes into contact with the upper surface of the core WP1. A distance in which the core adsorption holding part 20 is lowered can be set in advance. The core adsorption holding part 20 during machining may stop its lowering when the core adsorption detector 27 detects that the distal end surface 22a of the exposed rod member 22 is in contact with the upper surface of the core WP1.

When the base end portion of the moving cylindrical member 23 reaches a position facing the proximity sensor 27a, the core adsorption detector 27 outputs an ON signal indicating that the core WP1 is in contact with the distal end surface 22a of the rod member 22.

The core moving device 2 receives the ON signal of the core adsorption detector 27 and then moves the upper arm 15a upward to raise the core adsorption holding part 20. As illustrated in FIG. 4, the core adsorption holding part 20 rises to a height at which it does not interfere with other objects even when the core WP1 is moved back and forth and left and right to a position above the core recovery bucket 14b. When a movement distance only by the movement of the upper arm 15a is insufficient, the core adsorption holding part 20 may be moved by combining a plurality of drive units such as being moved in the vertical direction due to the vertical drive unit 29. At this time, when the cylindrical member 23 is lowered by its own weight and the core adsorption detector 27 indicates an OFF signal, it can be detected that the core WP1 cannot be adsorbed to the distal end surface 22a of the rod member 22 by the magnetic force. If the core member WP1 cannot be adsorbed to the rod member 22, it may be returned to the operation of bringing the distal end surface 22a of the rod member 22 into contact with the core member WP1 again, or an alarm may be issued to stop the core moving device 2 or the wire electric discharge machine 1.

As illustrated in FIG. 5, the core moving device 2 moves the core adsorption holding part 20 in the horizontal direction until the core WP1 is above the core recovery bucket 14b. If necessary, the core WP1 may be lowered into the core recovery bucket 14b. The core adsorption holding part 20 may be lowered into the core recovery bucket 14b, if necessary. When a movement distance only by the movement of the upper arm 15a is insufficient, the core adsorption holding part 20 may be moved by combining a plurality of drive units such as causing the machining tank 14 including the core recovery bucket 14b to move in the horizontal direction.

As illustrated in FIG. 10, the core adsorption holding part 20 lowers the push member 25a at the retreat position. The cylindrical member 23 is pushed by the push member 25a being lowered and is lowered relative to the rod member 22 until it is restricted by the movement restricting member 24. The core WP1 is separated from the distal end surface 22a of the rod member 22 to which it has been adsorbed by the magnetic force, further separated from the distal end surface 22a of the rod member 22 to a position at which it is not attracted to the distal end surface 22a of the rod member 22 by the magnetic force, and then drops into the core recovery bucket 14b due to its own weight. The push member 25a rises to the retreat position. At this time, if the core adsorption detector 27 indicates an OFF signal, it is detected that the core WP1 has dropped. Also, at this time, if the core adsorption detector 27 indicates an ON signal, it can be detected that the core WP1 has not dropped and is attracted by the magnetic force and adsorbed again to the distal end surface 22a of the rod member 22 by the magnetic force as the cylindrical member 23 is pushed upward. If the core WP1 has not dropped, it may be returned to the operation of removing the core WP1 from the distal end surface 22a of the rod member 22 again, or an alarm may be issued to stop the core moving device 2 or the wire electric discharge machine 1.

After the core WP1 is removed from the core adsorption holding part 20, the core moving device 2 raises the core adsorption holding part 20 to a height at which the core adsorption holding part 20 does not interfere with other objects. The core moving device 2 performs extraction of the core WP1 again at the next wire electric discharge machining.

The core moving device 2 of the wire electric discharge machine 1 of the embodiment of the disclosure has a simple configuration in which the rod member 22 is inserted into the cylindrical member 23, and the core WP1 adsorbed to the distal end surface 22a of the rod member 22 by the magnetic force can be reliably removed from the rod member 22. Since whether or not the core WP1 is adsorbed to the rod member 22 is easily detected by detecting a position of the cylindrical member 23 with respect to the rod member 22 using a mechanism of removing the core WP1 from the magnet 21, the core moving device 2 of the wire electric discharge machine 1 of the embodiment of the disclosure can reliably move the core WP1. The core moving device 2 of the wire electric discharge machine 1 of the embodiment of the disclosure is also capable of automatically moving the core WP1 which has been cut out of the workpiece WP using wire electric discharge machining.

The distal end surface 23a of the cylindrical member 23 may be a surface parallel to the distal end surface 22a of the rod member 22. As illustrated in FIG. 11, the distal end surface 23a of the cylindrical member 23 may have a slight step. When there is no gap between the distal end surface 22a of the rod member 22 and the core WP1 which are adsorbed to each other by the magnetic force, a force due to vacuum state may also act thereon. When the core WP1 adsorbed by the magnetic force without a gap is separated from the distal end surface 22a of the rod member 22, the slight step can make the core WP1 slightly inclined with respect to the distal end surface 22a of the rod member 22 first, and can form a slight gap between the distal end surface 22a of the rod member 22 and the core WP1 with a smaller force. The core WP1 is continuously pushed after the gap is formed, pushed to a position at which it is not attracted by the magnetic force from the distal end surface 22a of the rod member 22, and then removed from the distal end surface 22a of the rod member 22.

The embodiment was chosen in order to explain the principles of the disclosure and its practical application. Many modifications and variations are possible in light of the above teachings. It is intended that the scope of the disclosure be defined by the claims.

The invention claimed is:

1. A core moving device of a wire electric discharge machine comprising:
    a core adsorption holding part which adsorbs a core cut out of a workpiece with a magnetic force of a magnet and moves the core relative to the workpiece, wherein the core adsorption holding part includes:
    a rod member in which at least a distal end portion thereof is constituted of the magnet;
    a cylindrical member into which the rod member is inserted and which, on one hand, moves backward relative to the rod member to a base end portion side of the rod member to expose a distal end surface of the rod member so that the core is adsorbed to the distal end surface of the rod member by the magnet and, on the other hand, moves forward relative to the rod member to the distal end portion side of the rod member to protrude beyond the distal end surface of the rod member so that the core having been adsorbed to the distal end surface of the rod member by the magnet is pushed out against the magnetic force and removed; and
    a cylindrical member drive unit which moves the cylindrical member forward relative to the rod member to at least the distal end portion side of the rod member,
    wherein the core moving device further comprises a core adsorption detector which detects whether or not a position of the cylindrical member with respect to the rod member is at a position when the core is adsorbed to the distal end surface of the rod member.

2. The core moving device of a wire electric discharge machine according to claim 1, wherein the cylindrical member includes a movement restricting member which restricts forward movement of the cylindrical member beyond a predetermined distance from the distal end surface of the rod member,
    wherein the movement restricting member comprises an elongated hole and a key member, the elongated hole is formed in the rod member, and the key member penetrates the rod member and the cylindrical member and is inserted through the elongated hole.

3. The core moving device of a wire electric discharge machine according to claim 1, wherein the rod member is vertically disposed with the based end portion up and the distal end portion down.

4. The core moving device of a wire electric discharge machine according to claim 3, wherein the cylindrical member is lowered by its own weight.

5. The core moving device of a wire electric discharge machine according to claim 1, further comprising a core movement controller which controls the cylindrical member drive unit on the basis of an output signal of the core adsorption detector.

6. The core moving device of a wire electric discharge machine according to claim 1, further comprising a support member to which the base end portion of the rod member is attached and which moves relative to the workpiece together with the rod member.

7. The core moving device of a wire electric discharge machine according to claim 6, wherein the cylindrical member drive unit includes:
    a push member which moves forward from a retreat position to push out the cylindrical member in a direction in which the cylindrical member protrudes and then moves backward to return to the retreat position leaving the cylindrical member; and
    a push member drive source attached to the support member to drive the push member back and forth, wherein the push member drive source comprises a pneumatic actuator, a hydraulic actuator or an electric motor.

8. The core moving device of a wire electric discharge machine according to claim 1, further comprising a support member to which the base end portion of the rod member is attached and which moves relative to the workpiece together with the rod member.

9. The core moving device of a wire electric discharge machine according to claim 8, wherein the core adsorption detector is attached to the support member and includes a proximity sensor or a contact sensor attached at a position facing the base end portion of the cylindrical member when the core is adsorbed to the distal end surface of the rod member, the proximity sensor detects proximity of a base end portion of the cylindrical member in a non-contact manner, and the contact sensor detects proximity of the base end portion of the cylindrical member in a contact manner.

* * * * *